(12) United States Patent
Yamamoto et al.

(10) Patent No.: US 11,824,762 B2
(45) Date of Patent: Nov. 21, 2023

(54) TRANSMISSION PATH DESIGN APPARATUS, TRANSMISSION NETWORK TOPOLOGY DESIGN METHOD, AND TRANSMISSION PATH DESIGN PROGRAM FOR DESIGNING A COMMUNICATION PATH TOPOLOGY OPTIMIZED IN VIEW OF REDUCING AMOUNT OF EQUIPMENT NEEDED

(71) Applicant: Nippon Telegraph and Telephone Corporation, Tokyo (JP)

(72) Inventors: Hiroshi Yamamoto, Musashino (JP); Toshiyuki Oka, Musashino (JP); Hideki Maeda, Musashino (JP)

(73) Assignee: Nippon Telegraph and Telephone Corporation, Tokyo (JP)

( * ) Notice: Subject to any disclaimer, the term of this patent is extended or adjusted under 35 U.S.C. 154(b) by 34 days.

(21) Appl. No.: 17/619,982

(22) PCT Filed: Jun. 17, 2019

(86) PCT No.: PCT/JP2019/023936
§ 371 (c)(1),
(2) Date: Dec. 16, 2021

(87) PCT Pub. No.: WO2020/255216
PCT Pub. Date: Dec. 24, 2020

(65) Prior Publication Data
US 2022/0360520 A1    Nov. 10, 2022

(51) Int. Cl.
*H04L 45/24* (2022.01)
*H04L 45/02* (2022.01)
*H04L 45/12* (2022.01)

(52) U.S. Cl.
CPC .............. *H04L 45/24* (2013.01); *H04L 45/02* (2013.01); *H04L 45/126* (2013.01)

(58) Field of Classification Search
CPC ....... H04L 45/24; H04L 45/02; H04L 45/126; H04L 12/28
See application file for complete search history.

(56) References Cited

U.S. PATENT DOCUMENTS 6,278,689 B1 * 8/2001 Afferton ............ H04Q 11/0062
370/242
6,744,769 B1 * 6/2004 Siu .......................... H04L 12/42
370/395.51

(Continued)

OTHER PUBLICATIONS

Tibuleac, Sorin, and Mark Filer. "Transmission impairments in DWDM networks with reconfigurable optical add-drop multiplexers." Journal of Lightwave Technology 28.4 (2009): 557-598.*

(Continued)

*Primary Examiner* — Jimmy H Tran
(74) *Attorney, Agent, or Firm* — Fish & Richardson P.C.

(57) ABSTRACT

To easily design a communication path topology optimized in view of reducing the amount of equipment needed under the condition that availability against multiple failures in a network is maintained. A transmission path design apparatus (100) performs: a step (S14) of extracting, from the multiple base stations, a first group of base stations whose number of communication-path routes connected is large, based on transmission network model initial data (D0); a step (S16) of extracting a first group of communication paths connecting the base stations in the first group; a step (S16) of calculating a both-end path value (d_i,j) for each communication path in the first group; and steps (S18 to S24) of determining the communication path whose both-end path value satisfies a predetermined condition as a thinning-out target communication path, and generating output data Dy in which the thinning-out target communication path is reflected on the transmission network model initial data. The optimized output data (Dy) can be generated by extracting a deletable (Continued)

communication path in order from the model of the initial data (D0).

10 Claims, 15 Drawing Sheets

(56) References Cited

U.S. PATENT DOCUMENTS

| | | | | |
|---|---|---|---|---|
| 6,970,417 | B1* | 11/2005 | Doverspike | H04J 14/0284 370/227 |
| 7,043,250 | B1* | 5/2006 | DeMartino | H04L 45/22 370/242 |
| 7,209,975 | B1* | 4/2007 | Zang | H04L 41/0663 709/239 |
| 7,274,869 | B1* | 9/2007 | Pan | H04B 10/032 398/19 |
| 7,283,741 | B2* | 10/2007 | Sadananda | H04L 45/302 398/5 |
| 2001/0033548 | A1* | 10/2001 | Saleh | H04L 45/04 370/389 |
| 2002/0035640 | A1* | 3/2002 | Greenberg | H04Q 11/0071 709/230 |
| 2002/0131424 | A1* | 9/2002 | Suemura | H04L 41/12 370/228 |
| 2002/0191247 | A1* | 12/2002 | Lu | H04J 14/0228 398/79 |
| 2003/0185148 | A1* | 10/2003 | Shinomiya | H04L 45/28 370/216 |
| 2004/0114925 | A1* | 6/2004 | Berthold | H04J 14/0294 398/45 |
| 2004/0184402 | A1* | 9/2004 | Alicherry | H04L 45/00 709/239 |
| 2005/0197993 | A1* | 9/2005 | Korotky | H04L 41/145 706/52 |
| 2005/0265258 | A1* | 12/2005 | Kodialam | H04L 45/04 370/254 |
| 2006/0104641 | A1* | 5/2006 | Casanova | H04J 14/0228 398/83 |
| 2007/0212067 | A1* | 9/2007 | Miyazaki | H04J 14/0227 398/57 |
| 2008/0181605 | A1* | 7/2008 | Palacharla | H04J 14/0284 398/48 |
| 2008/0212497 | A1* | 9/2008 | Getachew | H04W 76/19 370/465 |
| 2009/0046572 | A1* | 2/2009 | Leung | H04Q 11/0062 370/216 |
| 2009/0232492 | A1* | 9/2009 | Blair | H04J 14/029 398/58 |
| 2010/0129078 | A1* | 5/2010 | Weston-Dawkes | H04J 14/0213 398/79 |
| 2010/0129082 | A1* | 5/2010 | Zhong | H04J 14/0205 398/83 |
| 2010/0142961 | A1* | 6/2010 | Wisseman | H04J 14/0212 398/83 |
| 2010/0226244 | A1* | 9/2010 | Mizutani | H04L 45/02 370/220 |
| 2010/0290780 | A1* | 11/2010 | Teipen | H04J 14/0227 398/34 |
| 2011/0182576 | A1* | 7/2011 | Zhou | H04J 14/0269 398/34 |
| 2011/0222846 | A1* | 9/2011 | Boertjes | H04J 14/0268 398/1 |
| 2012/0224851 | A1* | 9/2012 | Takara | H04L 12/42 398/45 |
| 2012/0250580 | A1* | 10/2012 | Testa | H04J 14/0201 370/254 |
| 2012/0294618 | A1* | 11/2012 | Yu | H04J 14/0204 398/83 |
| 2013/0115961 | A1* | 5/2013 | Shibayama | H04W 16/18 455/446 |
| 2013/0258842 | A1* | 10/2013 | Mizutani | H04L 41/0668 370/228 |
| 2013/0272693 | A1* | 10/2013 | Zhang | H04J 14/0284 398/5 |
| 2014/0056584 | A1* | 2/2014 | Testa | H04J 14/0217 398/49 |
| 2014/0126899 | A1* | 5/2014 | Prakash | H04L 45/28 398/5 |
| 2014/0169782 | A1* | 6/2014 | Hashiguchi | H04J 14/0291 398/5 |
| 2014/0348504 | A1* | 11/2014 | Blair | H04J 14/029 398/49 |
| 2015/0055953 | A1* | 2/2015 | Guy | H04J 14/0246 398/48 |
| 2015/0071633 | A1* | 3/2015 | Mehrvar | H04Q 11/0005 398/49 |
| 2015/0071635 | A1* | 3/2015 | Naito | H04Q 11/0066 398/49 |
| 2015/0103643 | A1* | 4/2015 | Fujioka | H04L 41/0668 370/218 |
| 2015/0156106 | A1* | 6/2015 | Allan | H04L 45/24 370/238 |
| 2016/0127034 | A1* | 5/2016 | Wellbrock | H04J 14/021 398/2 |
| 2016/0315695 | A1* | 10/2016 | Aoki | H04B 10/25752 |
| 2016/0315697 | A1* | 10/2016 | Breukelaar | H04J 14/0213 |
| 2016/0365921 | A1* | 12/2016 | Costantini | H04B 10/07955 |
| 2017/0279557 | A1* | 9/2017 | Kilper | H04B 10/11 |
| 2017/0338905 | A1* | 11/2017 | Tsuzuki | H04Q 11/0066 |
| 2018/0343685 | A1* | 11/2018 | Hart | H04W 48/20 |
| 2019/0149229 | A1* | 5/2019 | Yilmaz | H04L 41/0895 398/10 |
| 2019/0191354 | A1* | 6/2019 | Tan | H04W 76/10 |
| 2019/0327016 | A1* | 10/2019 | Bathula | H04L 41/145 |
| 2020/0177299 | A1* | 6/2020 | Bravi | G02B 6/29383 |
| 2021/0226706 | A1* | 7/2021 | Yutaka | H04J 14/0284 |
| 2021/0349265 | A1* | 11/2021 | Menard | G02B 6/357 |

OTHER PUBLICATIONS

Gringeri, Steven, et al. "Flexible architectures for optical transport nodes and networks." IEEE Communications Magazine 48.7 (2010): 40-50.*

Choudhury, Gagan, et al. "Two use cases of machine learning for SDN-enabled IP/optical networks: Traffic matrix prediction and optical path performance prediction." Journal of Optical Communications and Networking 10.10 (2018): D52-D62.*

Yamamoto et al., "Highly available metro transport network using multiple direction OXC," IEICE Technical Report, 2019, 118(465):261-265, 11 pages (with English Translation).

* cited by examiner

TRANSMISSION PATH DESIGN APPARATUS, TRANSMISSION NETWORK TOPOLOGY DESIGN METHOD, AND TRANSMISSION PATH DESIGN PROGRAM FOR DESIGNING A COMMUNICATION PATH TOPOLOGY OPTIMIZED IN VIEW OF REDUCING AMOUNT OF EQUIPMENT NEEDED

CROSS-REFERENCE TO RELATED APPLICATIONS

This application is a National Stage application under 35 U.S.C. § 371 of International Application No. PCT/JP2019/023936, having an International Filing Date of Jun. 17, 2019. The disclosure of the prior application is considered part of the disclosure of this application, and is incorporated in its entirety into this application.

TECHNICAL FIELD

The present invention relates to a transmission path design apparatus, a transmission network topology design method, and a transmission path design program that can be used for designing regional transmission networks or the like.

BACKGROUND ART

There is a demand for reducing operating costs of equipment and maintenance of optical transmission networks used for regional transmission networks or the like while maintaining high communication quality and availability as a common infrastructure. In addition, the regional transmission networks, which are desired to efficiently accommodate user traffic, commonly have a multi-ring configuration that simply ensures path redundancy by using a two-direction ROADM (Reconfigurable Optical Add/Drop Multiplexer). However, to maintaining high availability, quick recovery measures are needed, and therefore, a large-scale maintenance system is needed.

Further, in recent years, enhancement of countermeasures against wide-area disasters has become an important issue. However, in the case of the redundancy provided by the multi-ring configuration, division of a network and isolation could occur due to a wide-area disaster. NPL 1 proposes to increase availability of regional transmission networks by using a multiple direction OXC (optical cross-connect) to construct an optical transmission network having a mesh configuration so that, when a failure occurs, a route that bypasses the faulty location is set (restored).

CITATION LIST

Non Patent Literature

[NPL 1] Hiroshi Yamamoto, Toshiyuki Oka, Yoshihiko Uematsu, Hideki Maeda, "Highly available metro transport network using multiple direction OXC", the Institute of Electronics, Information and Communication Engineers Technical Report, March 2019, IEICE Technical Report, vol. 118, No. 465, NS2018-237, pp 261-265

SUMMARY OF THE INVENTION

Technical Problem

However, compared to a case with the multi-ring configuration, a case with the mesh configuration described in NPL 1 uses more communication paths (links) between buildings each of which accommodates communication equipment of a communication base station. Namely, the adoption of the mesh configuration leads to an increase in the amount of equipment such as an inter-station amplifier. This causes a concern of an increase in the operating costs of the equipment and maintenance.

Thus, there is a demand for a communication path topology such that, under a condition that availability against multiple failures is maintained, the communication paths between the buildings are thinned out to reduce the amount of equipment needed. However, an operation of designing such an optimized communication path topology is not easy.

With the foregoing in view, it is an object of the present invention to provide a transmission path design apparatus, a transmission network topology design method, and a transmission path design program that can easily design a communication path topology optimized in view of reducing the amount of equipment needed, under the condition that availability against multiple failures is maintained.

Means for Solving the Problem

A transmission path design apparatus of the present invention includes: an initial data holding unit that holds initial data of a transmission network model in which a plurality of base stations adjacent to each other in a transmission network having multiple base stations are connected by communication paths that are configured in a mesh shape as a whole; a model calculation unit that acquires initial data of a transmission network model held by the initial data holding unit and extracts, from the multiple base stations in the transmission network model, a first group of base stations each of which has the number of communication-path routes connected thereto larger than a specified value, extracts, from the communication paths, a first group of communication paths each of which connects the base stations in the first group, determines a first base station connected to one end of each of the communication paths in the first group and a second base station connected to an opposite end of the each of the communication paths in the first group, calculates a both-end path value based on the number of the communication-path routes of the first base station and the number of the communication-path routes of the second base station, determines, in the first group of communication paths, the communication path whose both-end path value satisfies a predetermined condition as a thinning-out target communication path, and generates output data in which the thinning-out target communication path is reflected on the initial data of the transmission network model; and a data output unit that outputs output data generated by the model calculation unit.

Effects of the Invention

According to a transmission network topology design method, a transmission path design program, and a transmission path design apparatus of the present invention, under the condition that availability against multiple failures is maintained, a communication path topology optimized in view of reducing the amount of equipment needed can be easily designed. In other words, it is possible to automate designing of a communication path topology and assist the design work of a designer.

DESCRIPTION OF EMBODIMENTS

An embodiment of the present invention will be described below with reference to the drawings.

<Description of Environment to which Invention is Applied>

<Configuration Example of Optical Transmission Network>

Figure 1A:
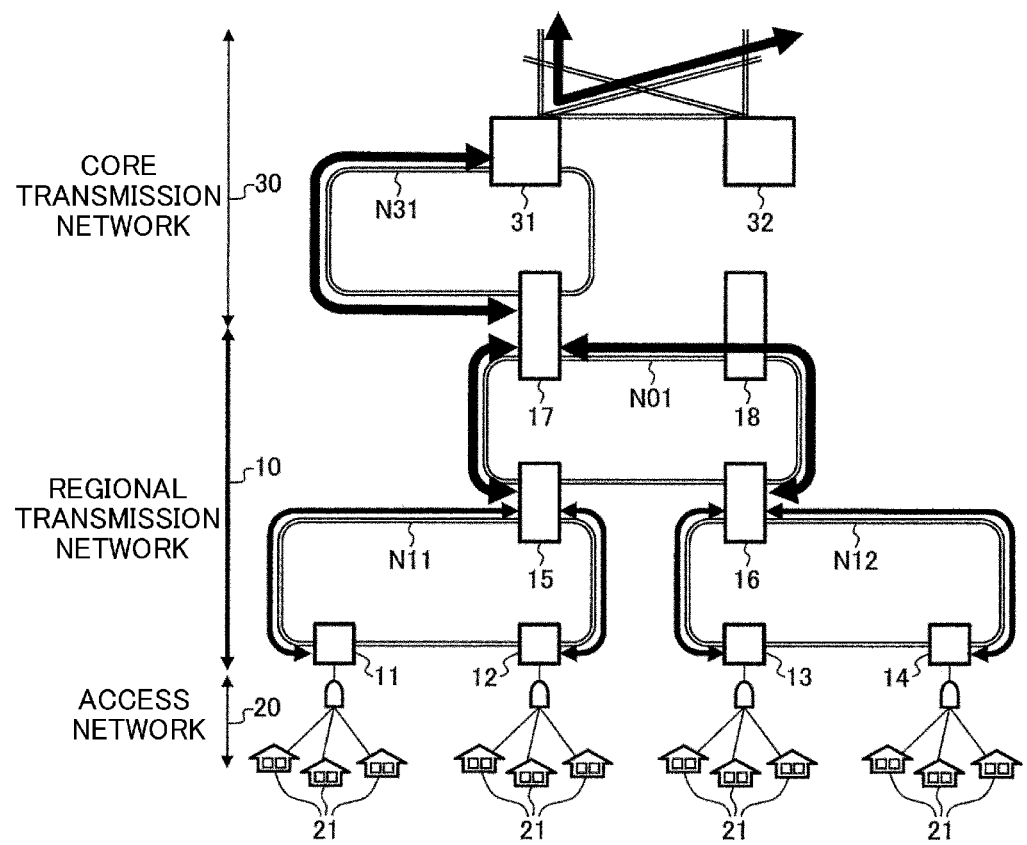
FIG. 1A is a block diagram illustrating a configuration example of a main part of a wide-area optical transmission network.
Figure 1B:
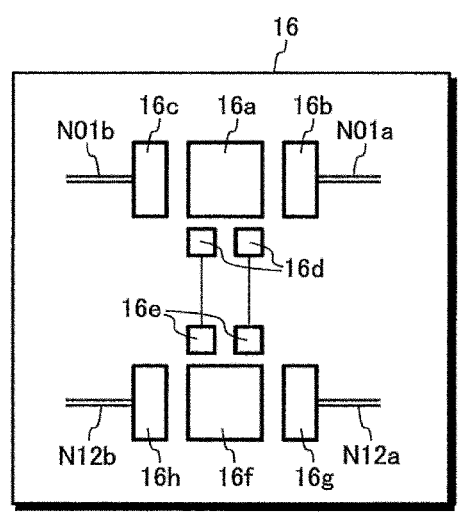
FIG. 1B is a block diagram illustrating a configuration example of communication equipment in a regional representative building.
Figure 1C:
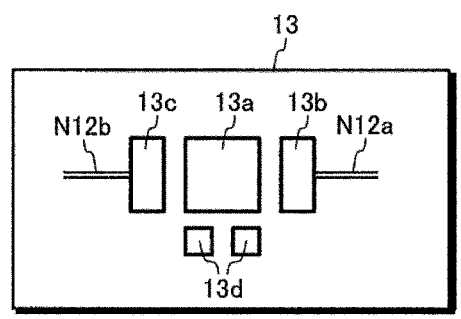
FIG. 1C is a block diagram illustrating a configuration example of communication equipment in a regional building.

FIG. 1A illustrates a configuration example of a main part of a wide-area optical transmission network. FIG. 1B illustrates a configuration example of communication equipment in a regional representative building 16 in FIG. 1A. FIG. 1C illustrates a configuration example of communication equipment in a regional building 13.

The optical transmission network illustrated in FIG. 1A includes a regional transmission network 10, an access network 20, and a core transmission network 30. Optical communication equipment serving as a base station of a communication network is accommodated in an individual building. The access network 20 provides a user with a communication environment by connecting a user terminal 21 in a home or the like to anyone of regional buildings 11, 12, 13, and 14.

The regional transmission network 10 is a communication network connecting a plurality of buildings in an urban area or the like, that is, a metro network. In an example in FIG. 1A, communication networks N11, N12, and N01 are included in the regional transmission network 10. The communication network N11 connects a regional representative building 15 and the regional buildings 11 and 12 to one another via optical fiber communication paths configured in a ring shape.

The communication network N12 connects the regional representative building 16 and the regional buildings 13 and 14 to one another via optical fiber communication paths configured in a ring shape. The communication network N01 connects prefectural representative buildings 17 and 18 and the regional representative buildings 15 and 16 to one another via optical fiber communication paths configured in a ring shape.

In addition, in the example in FIG. 1A, the communication network N11 and the communication network N01 are connected to each other via the regional representative building 15, and the communication network N12 and the communication network N01 are connected to each other via the regional representative building 16. Further, a communication network N31 in the core transmission network 30 and the communication network N01 in the regional transmission network 10 are connected to each other via the prefectural representative building 17. The core transmission network 30 includes a plurality of core representative buildings 31. The communication network N31 connects the core representative building 31 and the prefectural representative building 17 to each other via optical fiber communication paths configured in a ring shape.

Since each of the ring-shaped communication paths of the communication networks N01, N11, N12, and N31 is redundant, the communication equipment connected to the ring-shaped communication paths can communicate using a clockwise path or a counterclockwise path on the ring-shaped communication paths. This provides tolerance for a failure such as a line disconnection.

As illustrated in FIG. 1B, the regional representative building 16 includes an optical switch (OXC) 16a, inter-station interfaces 16b and 16c, and a transponder (TPND) 16d as the equipment on the communication network N01 side. In addition, the regional representative building 16 includes an optical switch 16f, inter-station interfaces 16g and 16h, and a transponder (TPND) 16e as the equipment on the communication network N12 side.

The optical switch 16a is connected to one end N01a of the communication network N01 via the inter-station interface 16b and to another end N01b of the communication network N01 via the inter-station interface 16c. The optical switch 16f is connected to one end N12a of the communication network N12 via the inter-station interface 16g and to another end N12b of the communication network N12 via the inter-station interface 16h. The transponder 16d and the transponder 16e are connected to each other.

Likewise, the regional building 13 illustrated in FIG. 1C includes an optical switch 13a, inter-station interfaces 13b and 13c, and a transponder 13d as the equipment on the communication network N12 side. The optical switch 13a is connected to one end N12a of the communication network N12 via the inter-station interface 13b and to another end N01b of the communication network N12 via the inter-station interface 13c.

<Regional Transmission Network Modeling>

Figure 2:
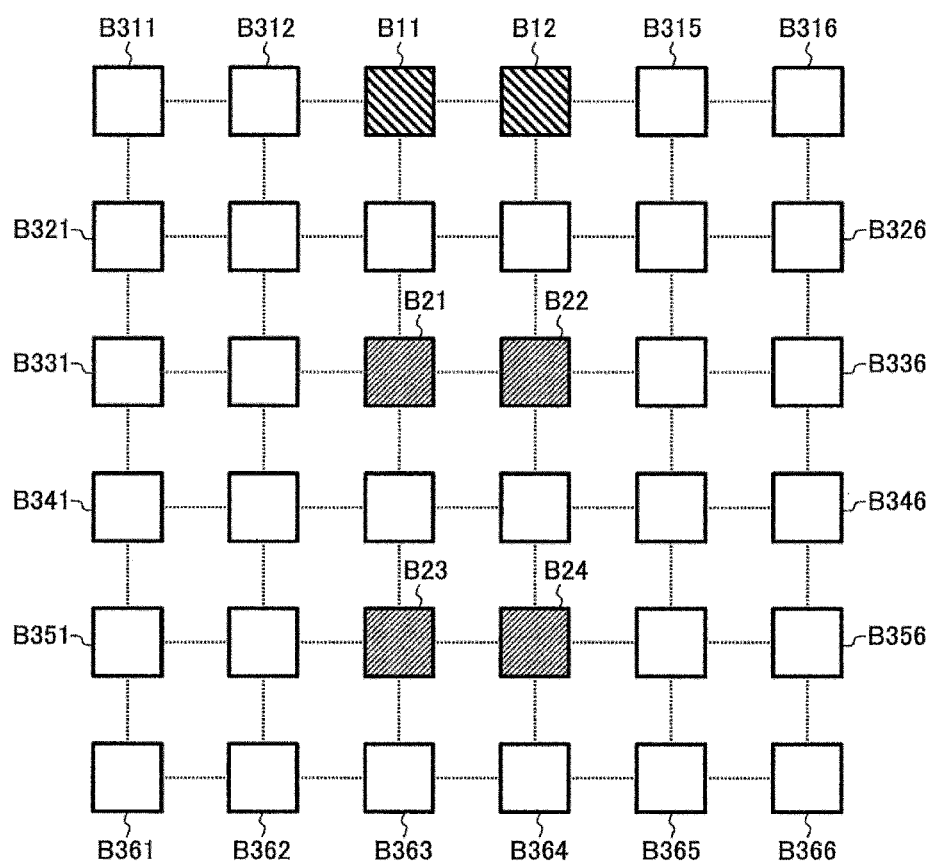
FIG. 2 is a schematic view illustrating a configuration example of a model in which base stations in a regional transmission network are arranged at their respective positions on a square grid.

FIG. 2 illustrates a configuration example of a model in which base stations in the regional transmission network 10 are arranged at their respective positions on a square grid. This model represents multiple buildings each serving as a communication base station and physical connections among the buildings. Creating the model as illustrated in FIG. 2 facilitates determination on the communication route optimization in the topology design of the regional transmission network.

In the example of the model illustrated in FIG. 2, buildings B11 and B12 correspond to the prefectural representative buildings 17 and 18 in FIG. 1A, and buildings B21, B22, B23, and B24 correspond to the regional representative buildings 15 and 16 in FIG. 1A. Further, buildings B311, B312, B315, B316, . . . , which are not hatched in FIG. 2, correspond to the regional buildings 11, 12, 13, and 14 in FIG. 1A.

<Regional Transmission Network Model with Multi-Ring Configuration>

Figure 3:
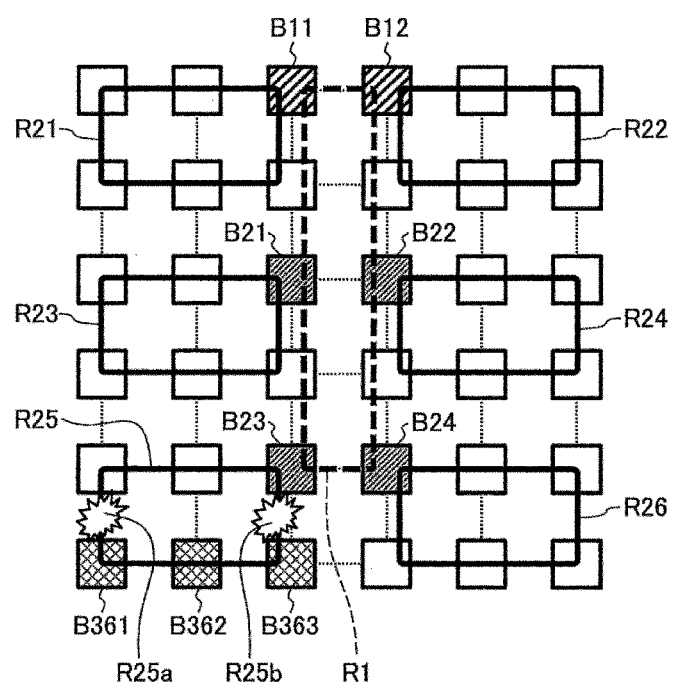
FIG. 3 is a schematic view illustrating a regional transmission network mode including communication paths in a multi-ring configuration.

FIG. 3 illustrates a model of a regional transmission network in which communication paths have a multi-ring configuration.

In the model illustrated in FIG. 3, buildings B11 and B12 corresponding to the prefectural representative buildings 17 and 18 in FIG. 1A and buildings B21 to B24 corresponding to the regional representative buildings 15 and 16 in FIG. 1A are connected to one another through a ring communication network R1.

In addition, ring communication networks R21, R22, R23, R24, R25, and R26 are connected to the buildings B11, B12, B21, B22, B23, and B24, respectively. The ring communication network R21 connects the building B11 and regional buildings near the building B11 via a ring-shaped communication path. The ring communication network R22 connects the building B12 and regional buildings near the building B12 via a ring-shaped communication path. The ring communication network R23 connects the building B21 and regional buildings near the building B21 via a ring-shaped communication path. The ring communication network R24 connects the building B22 and regional buildings near the building B22 via a ring-shaped communication path. The ring communication network R25 connects the building B23 and regional buildings near the building B23 via a ring-shaped communication path. The ring communication network R26 connects the building B24 and regional buildings near the building B24 via a ring-shaped communication path.

Assuming a situation where a large-scale disaster has occurred, a failure such as a line disconnection is assumed to simultaneously occur at multiple locations in a certain area. For example, in a case where the communication paths are simultaneously disconnected at two faulty locations R25a and R25b in the model illustrated in FIG. 3, a plurality of buildings B361, B362, and B363 connected to the ring communication network R25 all falls into a state of isolation since no communication paths are available for any of these buildings to connect to the building B23. Namely, none of the communication equipment of the buildings B361, B362, and B363 can ensure a communication route that bypasses the faulty locations R25a and R25b.

<Regional Transmission Network Model with Mesh Configuration>

Figure 4A:
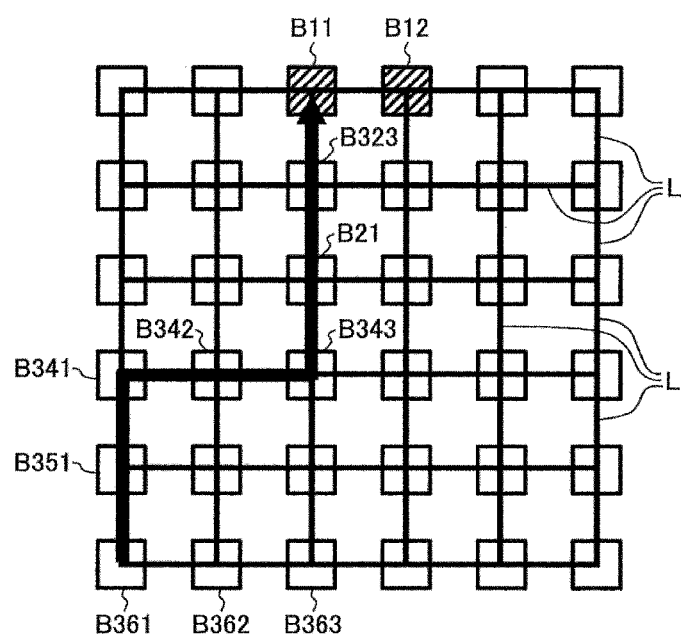
FIGS. 4A and 4B are schematic views illustrating a route before failures occur and a route after the failures occur in a regional transmission network model in which communication paths have a mesh configuration, respectively.
Figure 4B:
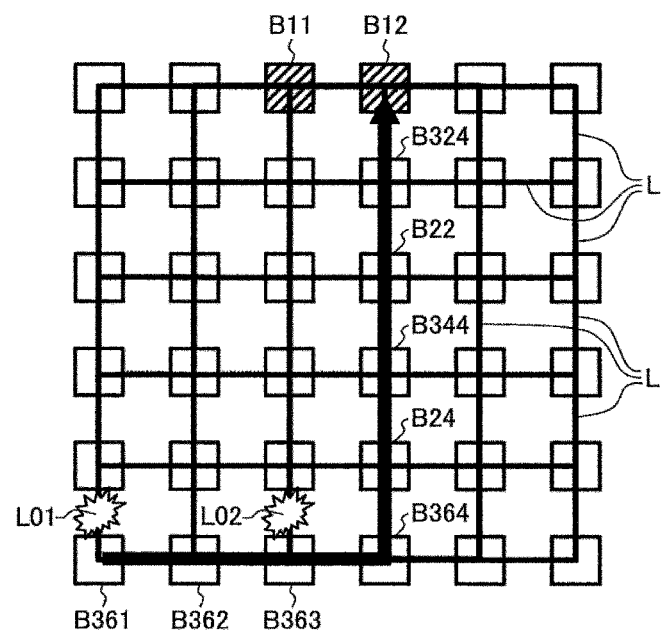

FIGS. 4A and 4B illustrate regional transmission network models each in which communication paths have a mesh configuration. Further, FIGS. 4A and 4B illustrate a route before failures occur and a route after failures occur, respectively.

In the models illustrated in FIGS. 4A and 4B, buildings B11 and B12 corresponding to the prefectural representative buildings 17 and 18 in FIG. 1A and multiple buildings corresponding to the regional buildings 11 to 14 in FIG. 1A are arranged at their respective positions on a square grid. In addition, in the models in FIGS. 4A and 4B, the buildings arranged adjacent to each other are individually connected by independent inter-station communication paths L. Namely, the inter-station communication paths L are configured in a mesh shape.

In the model in FIG. 4A, for example, when communication is performed between the buildings B361 and B11, the communication can be performed by using a route passing through the buildings B351, B341, B342, B343, B21, and B323 in this order.

In contrast, in the model in FIG. 4B, it is assumed that failures simultaneously occur at two faulty locations L01 and L02. Thus, when communication is performed between the building B361 and the building B11, the same route as in FIG. 4A cannot be used. However, using a new different route that bypasses each of the faulty locations L01 and L02 enables the communication between the building B361 and the building B11. Namely, in the model in FIG. 4B, a communication route from the location of the building B361 to the building B12 can be ensured by passing through the buildings B362, B363, B364, B24, B44, B22, and B324 in this order. The same communication route can be used for the buildings B362 and B363.

That is to say, in the regional transmission network with the multi-ring configuration illustrated in FIG. 3, failures that simultaneously occur at two faulty locations R25a and R25b cause the isolation of the buildings B361, B362, and B363. In contrast, with the mesh configuration in FIG. 4B, any of the buildings B361, B362, and B363 can perform communication, namely, the occurrence of isolation can be avoided.

However, the configuration of the communication paths with the mesh configuration as illustrated in FIGS. 4A and 4B is more complex than that with the multi-ring configuration illustrated in FIG. 3. Thus, it is assumed that the equipment costs and maintenance operating costs increase. In the case with the mesh configuration, however, the communication path connecting two buildings located adjacent to each other is not indispensable for all the combination of the two buildings as illustrated in FIG. 4A. That is, even if some of the communication paths are thinned out and reduced from the configuration of FIG. 4A, it is possible to maintain availability against multiple (two or more) failures that simultaneously occur in the event of a wide-area disaster, and the occurrence of isolation of the buildings and line disconnection as illustrated in FIG. 4B can be avoided.

A transmission path design apparatus, a transmission network topology design method, and a transmission path design program of the present invention described below can be used for, upon designing a regional transmission network using a model with a mesh configuration, automating or assisting an operation for optimizing the transmission network topology by reducing the number of communication paths connecting adjacent buildings while maintaining availability against multiple failures that simultaneously occur.

<Configuration Example of Transmission Path Design Apparatus>

Figure 5:
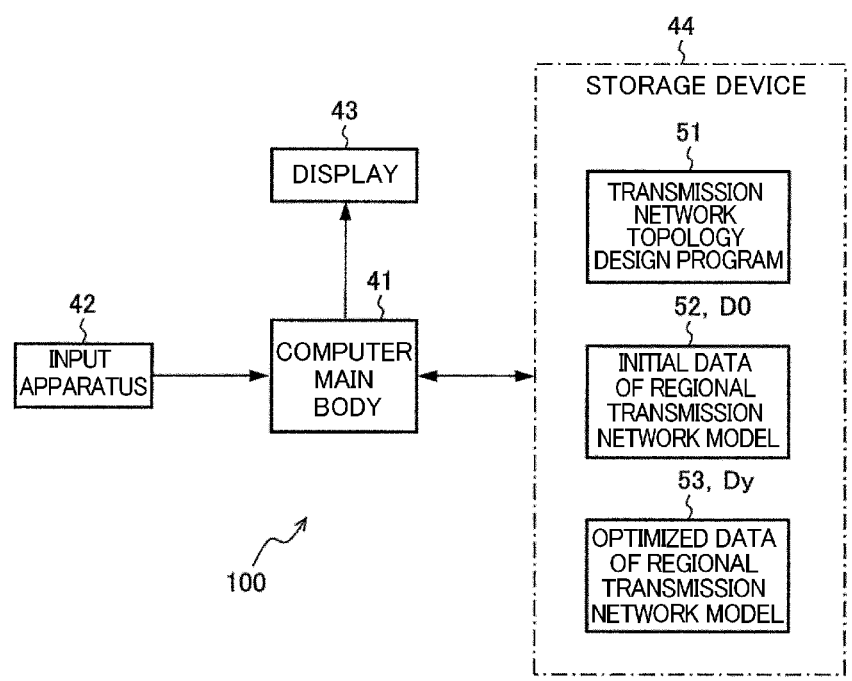
FIG. 5 is a block diagram illustrating a configuration example of a transmission path design apparatus according to an embodiment of the present invention.

FIG. 5 illustrates a configuration example of a transmission path design apparatus 100 according to the embodiment of the present invention.

As with the case of a common computer system such as a personal computer, the transmission path design apparatus 100 illustrated in FIG. 5 includes a computer main body 41, an input apparatus 42, a display 43, and a storage device 44 as hardware.

The storage device 44 illustrated in FIG. 5 holds a transmission path topology design program 51 executable by the computer main body 41. Further, the storage device 44 includes a storage area for holding initial data 52 and D0 of the regional transmission network model and optimized data 53 and Dy of the regional transmission network model.

The initial data 52 of the regional transmission network model is created and prepared by a designer in advance before the transmission path topology design program 51 is executed or automatically created by the transmission path topology design program 51. Further, when the transmission path topology design program 51 processes the initial data 52 and D0 of the regional transmission network model, the optimized data 53 of the regional transmission network model is automatically generated as the output data Dy.

<Processing Procedure of Transmission Network Topology Design Method and Transmission Path Design Program>

Figure 6:
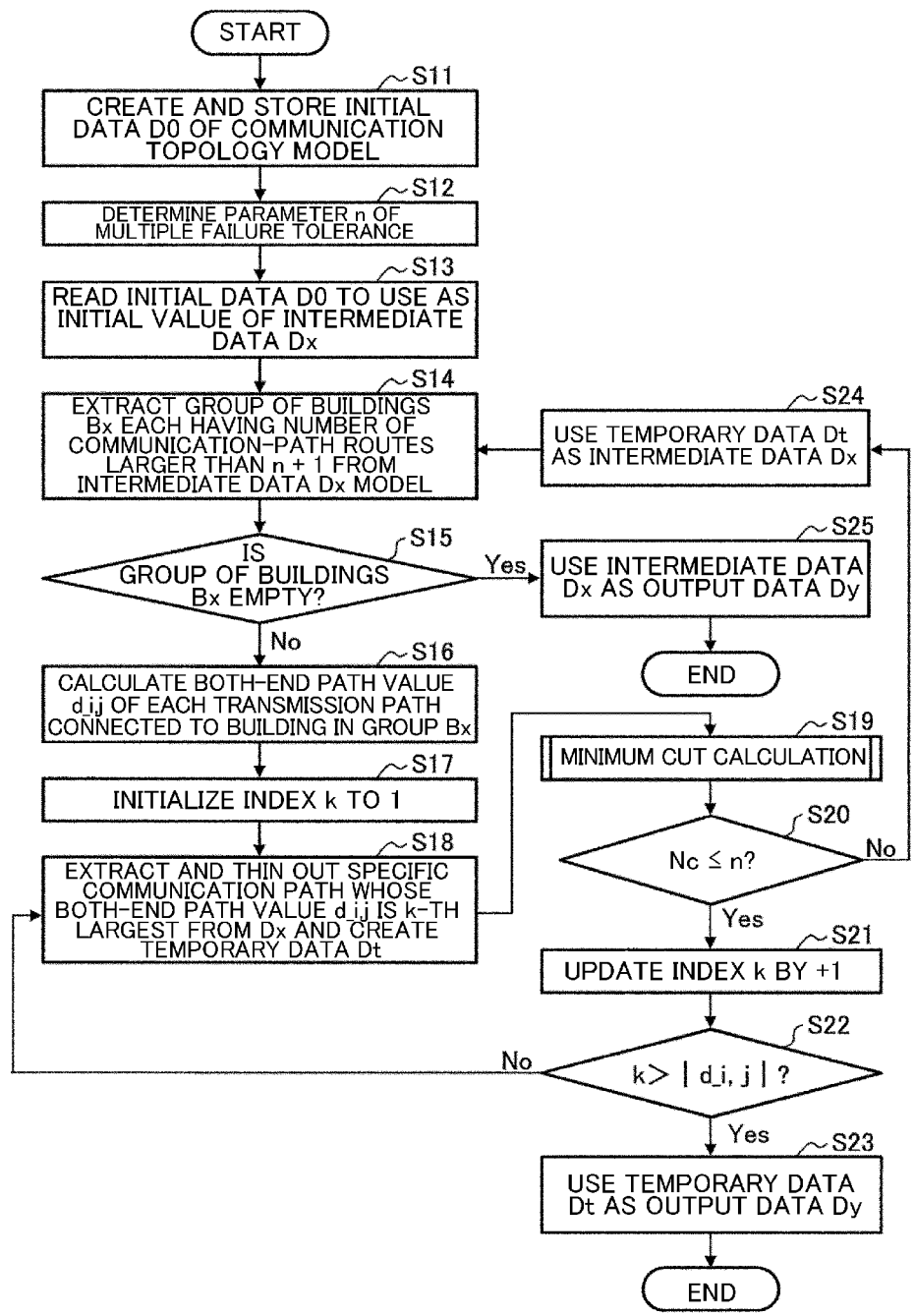
FIG. 6 is a flowchart illustrating an example of a processing procedure of a transmission network topology design method and a transmission path design program according to the embodiment of the present invention.
Figure 7:
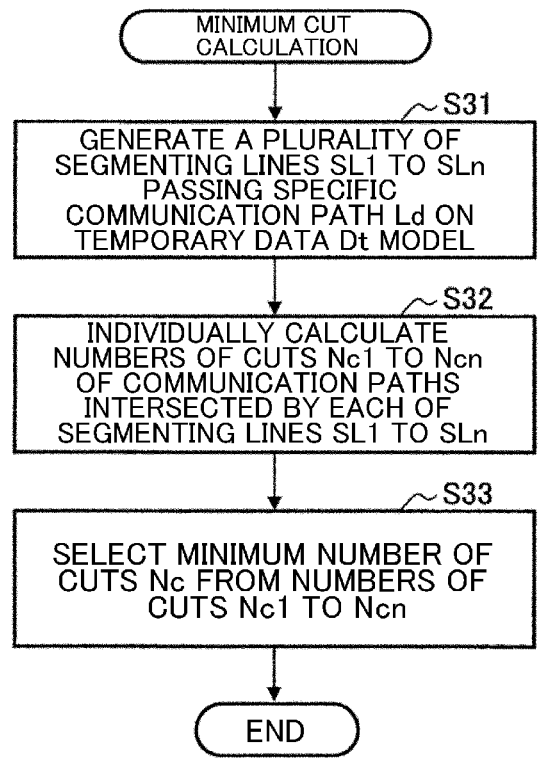
FIG. 7 is a flowchart illustrating details of step S19 in FIG. 6.

FIG. 6 illustrates an example of a processing procedure of the transmission network topology design method and the transmission path design program according to the embodiment of the present invention. FIG. 7 illustrates details of step S19 in FIG. 6. Namely, an operation of the transmission path design apparatus 100 illustrated in FIG. 5 is illustrated in FIGS. 6 and 7. The operation illustrated in FIGS. 6 and 7 will be described below.

Figure 8:
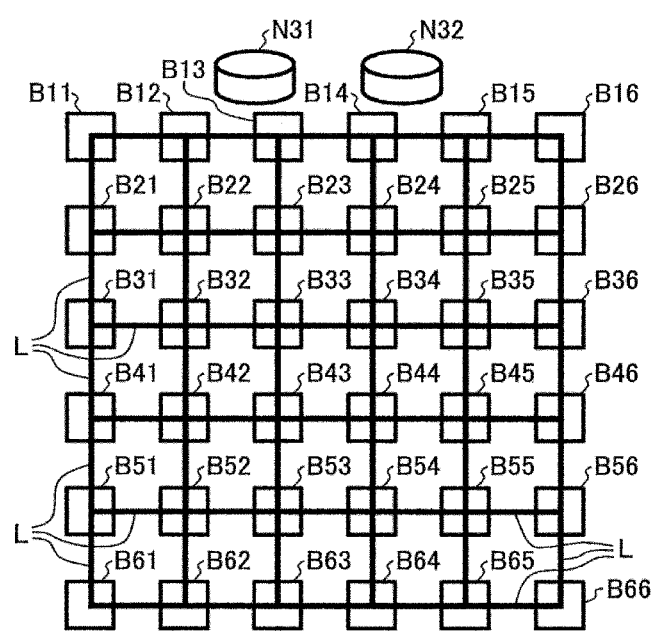
FIG. 8 is a schematic view illustrating an example of an initial state of a regional transmission network model in which communication paths have a mesh configuration.

In the first step S11, the computer main body 41 creates initial data D0 of a communication path topology model by an input operation of a designer or by a predetermined algorithm included in the transmission path topology design program 51 and stores the initial data D0 in the storage device 44. This initial data D0 is, for example, data having a communication path configuration in a mesh shape as illustrated in FIG. 8.

In the next step S12, the computer main body 41 receives the input operation of the designer related to a value of a parameter n of multiple failure tolerance. Alternatively, the computer main body 41 determines the parameter n of multiple failure tolerance by the transmission path topology design program 51. In the present embodiment, since the topology is designed assuming that isolation of a building does not occur even if failures simultaneously occur in two communication paths in the event of a large-scale disaster, the parameter n of the multiple failure tolerance is limited to a value of "2" or more.

In step S13, the computer main body 41 executing the transmission path topology design program 51 reads the initial data D0 from the storage device 44 and sets the read data as an initial value of intermediate data Dx. The computer main body 41 performs each step thereafter by executing the transmission path topology design program 51.

In step S14, the computer main body 41 extracts a whole group of buildings Bx each of which has the "number of communication-path routes" larger than n+1 from the model of the intermediate data Dx.

In step S15, the computer main body 41 determines whether the extracted group of buildings Bx does not exist, in other words, whether the extracted group of buildings Bx has been processed and is empty. If the computer main body 41 determines that the extracted group of buildings Bx exists and there is an unprocessed building, namely, the group of buildings Bx is not empty (No), the processing proceeds to step S16. If the computer main body 41 determines that the extracted group of buildings Bx does not exist or there is no unprocessed building, namely, the group of buildings Bx is empty (Yes), the computer main body 41 outputs the intermediate data Dx as output data Dy (S25) and ends the processing in FIG. 6.

In step S16, the computer main body 41 calculates a "both-end path value d_i,j" for each of the communication paths connected to the group of buildings Bx. The computer main body 41 calculates the "both-end path value d_i,j" by using the following equation (1).

$$d\_i,j = d\_i \times d\_j \tag{1}$$

Note: d_i: the "number of communication-path routes" of a building on one end side of one specific communication path d_j: the "number of communication-path routes" of a building on the other end side of the above communication path In step S17, the computer main body 41 initializes an index k to "1".

In step S18, the computer main body 41 extracts a specific communication path having the k-th largest "both-end path value d_i,j" and creates temporary data Dt based on a result of thinning out this specific communication path from the intermediate data Dx. The thinning-out of the specific communication path in step S18 is "provisional deletion", which is not yet finalized. Thus, the result of the "provisional deletion" is regarded as the temporary data Dt.

In step S19, the computer main body 41 performs the process of "minimum cut calculation" illustrated in detail in FIG. 7. While the content of this process will be described below, the computer main body 41 determines the minimum number of cuts Nc as a result of this process. However, when calculating the minimum number of cuts Nc, the computer main body 41 excludes the buildings B11, B16, B61, and B66 at the four corners from the calculation. That is, each of the buildings at the four corners has the "number of communication-path routes" of "2" from the beginning, and to provide tolerance for simultaneous failures of the communication paths at two or more locations, the inter-station communication paths L connected to each of the buildings at the four corners cannot be thinned out. Therefore, these buildings are excluded from the processing targets.

In step S20, the computer main body 41 determines whether the minimum number of cuts Nc determined in step S19 is equal to or less than the parameter n of multiple failure tolerance, namely, whether a condition of "Nc≤n" is satisfied. If the computer main body 41 determines that the minimum number of cuts Nc is equal to or less than the parameter n of multiple failure tolerance (Yes), the processing proceeds to step S21, and if the minimum number of cuts Nc exceeds the parameter n of multiple failure tolerance (No), the processing proceeds to step S24.

That is, if the condition of "Nc≤n" is satisfied, the condition of the multiple failure tolerance is not satisfied due to the impact of the specific communication path that has been thinned out immediately before as the "provisional deletion" in step S18. Thus, the computer main body 41 discards the temporary data Dt in which the "provisional deletion" is reflected, and the processing proceeds to step S21 to search for a next target communication path to be thinned out.

In step S21, the computer main body 41 adds +1 to the index k to update this value. Next, in step S22, the computer main body 41 determines whether the updated index k value is larger than the absolute value of the "both-end path value d_i,j", namely, whether a condition of "k>|d_i,j|" is satisfied. If the computer main body 41 determines that the condition of "k>|d_i,j|" is satisfied (Yes), the processing proceeds to step S23, and if this condition is not satisfied, the processing proceeds to step S18.

In step S23, the computer main body 41 outputs the current temporary data Dt as output data Dy and ends this processing.

In step S24, the computer main body 41 allocates the current temporary data Dt to the subsequent intermediate data Dx. That is, the computer main body 41 accepts the "provisional deletion" of the specific communication path in step S18 as the intermediate data Dx, and the processing proceeds to step S14.

The "minimum cut calculation" in FIG. 7 will be described. In step S31, the computer main body 41 generates various segmenting lines SL1 to SLn each passing a specific communication path Ld on the model of the temporary data Dt. Here, the specific communication path Ld corresponds only to the "provisional deletion" communication path thinned out immediately before in step S18.

Next, in step S32, the computer main body 41 individually calculates the numbers of cuts Nc1 to Ncn of the communication paths intersected by each of the various segmenting lines SL1 to SLn.

In step S33, the computer main body 41 selects the minimum value of the numbers of cuts Nc1 to Ncn calculated in step S32 and sets the selected value as the minimum number of cuts Nc.

<Changes in Configuration by Optimization>

Figure 9:
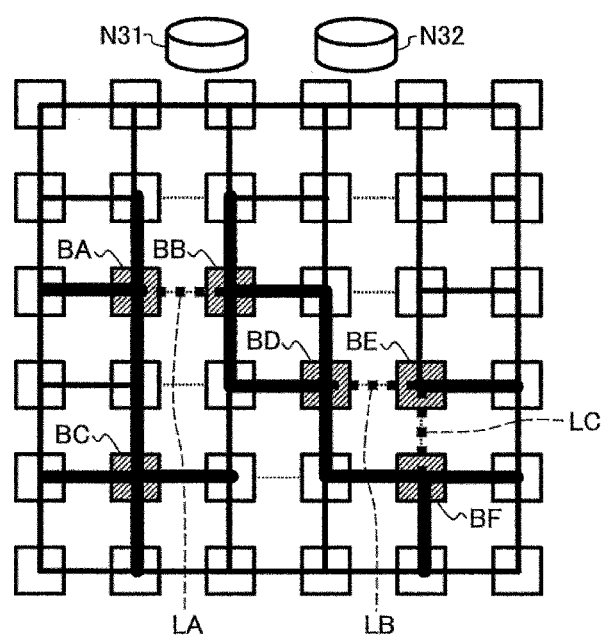
FIG. 9 is a schematic view illustrating example-1 of the regional transmission network model in which communication paths have a mesh configuration during processing.
Figure 10:
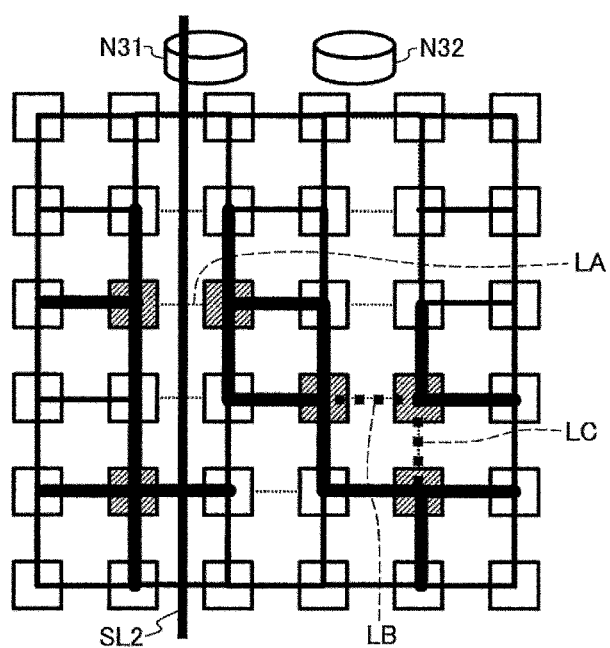
FIG. 10 is a schematic view illustrating example-2 of the regional transmission network model in which communication paths have a mesh configuration during processing.
Figure 11:
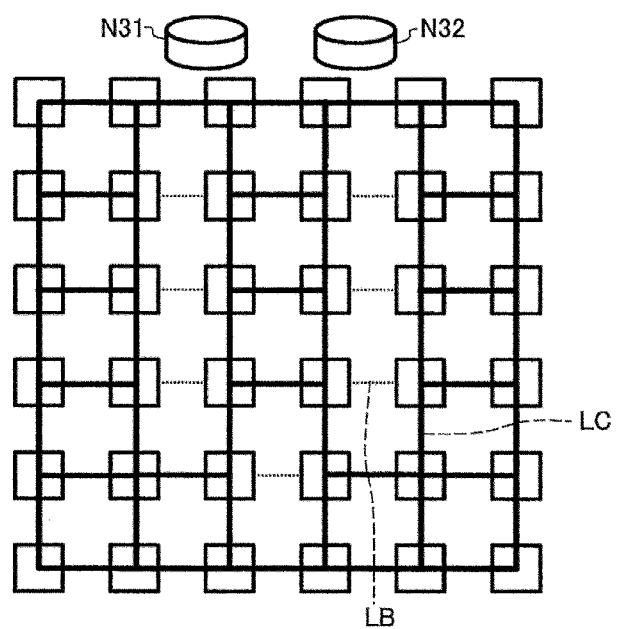
FIG. 11 is a schematic view illustrating an example of a processing result of the regional transmission network model in which the communication paths have a mesh configuration.

FIGS. 8 to 11 illustrate changes in configuration when the transmission network topology design method is applied to a regional transmission network model in which communication paths have a mesh configuration. FIG. 8 illustrates an example of an initial state, FIGS. 9 and 10 illustrate examples of the processing in progress, and FIG. 11 illustrates an example of a result of the processing. That is, when the transmission path design apparatus 100 illustrated in FIG. 5 performs each procedure of the transmission path topology design program 51 illustrated in FIGS. 6 and 7, the topology of the model changes as illustrated in FIGS. 8 to 11.

In the model in the initial state illustrated in FIG. 8, namely, in the initial data D0, multiple buildings B11, B12, B13, . . . are arranged at respective positions on a square grid, as in the model illustrated in FIG. 4A, and each of the adjacent buildings are connected to each other with an inter-station communication path (link) L. In addition, in the example in FIG. 8, since it is assumed that the building B13 corresponds to the prefectural representative building 17 illustrated in FIG. 1A, the building B13 in FIG. 8 is also connected to a communication network N31. Likewise, the building B14 in FIG. 8 is also connected to a communication network N32.

FIG. 9 illustrates an intermediate result in which the computer main body 41 executes the transmission path topology design program 51 and thins out and reduce some of the inter-station communication paths L from the initial state in FIG. 8, namely, a state of the intermediate data Dx at a certain point in the processing. In FIG. 9, a connection portion between the buildings indicated by thin dashed lines represents an inter-station communication path L that has been thinned out. In addition, specific communication paths LA, LB, and LC, which are processing targets, are indicated by thick dashed lines.

In FIG. 9, for example, the building BA has four inter-station communication paths L each of which connects the building BA to another building adjacent to the building BA. This indicates that the "number of communication-path routes" of the building BA is "4". Likewise, in the example in FIG. 9, the "number of communication-path routes" of each of the buildings BB, BC, BD, BE and BF is also "4".

Assuming that the parameter n of multiple failure tolerance is "2", the group of buildings Bx whose "number of communication-path routes" is more than "3" is extracted in step S14 in FIG. 6. Thus, in the example in FIG. 9, the buildings BA, BB, BC, BD, BE, and BF are each extracted as the group of buildings Bx.

In addition, since the communication path to be processed in step S16 of FIG. 6, is the communication path that connects the buildings included in the group of buildings Bx, each of the specific communication paths LA, LB, and LC in FIG. 9 corresponds to this processing target. Further, since one end of the specific communication path LA is connected to the building BA and the other end thereof is connected to the building BB, the "number of communication-path routes" d_i of the building on one end side of the specific communication path LA is "4", and the "number of communication-path routes" d_j of the building on the other end side thereof is "4". Thus, based on the equation (1), a calculation result of the "both-end path value d_i,j" of the specific communication path LA is "16". Likewise, a calculation result of the "both-end path value d_i,j" of each of the specific communication paths LB and LC in FIG. 9 is also "16".

Thus, in the example in FIG. 9, any one of the specific communication paths LA, LB, and LC is a candidate selectable as a thinning-out target. Actually, in step S18 in FIG. 6, the thinning-out target communication path is selected. Since the value of the index k is "1" at the beginning, the communication path having the largest "both-end path value d_i,j" is thinned out first. However, in the example in FIG. 9, all of the specific communication paths LA, LB, and LC have the "both-end path value d_i,j" of "16", which is the largest. In this case, for example, one specific communication path is randomly selected to be thinned out from the largest specific communication paths LA, LB, and LC.

FIG. 10 illustrates a state in which the specific communication path LA is thinned out and reduced from the model having the configuration illustrated in FIG. 9. The specific communication path Ld focused on in step S31 illustrated in FIG. 7 is one communication path that has been thinned out in the immediately preceding process. That is, in the example in FIG. 10, only the specific communication path LA that has been thinned out in the immediately preceding process corresponds to the specific communication path Ld in step S31.

One segmenting line SL2 illustrated in FIG. 10 is an imaginary line that divides the whole model into two regions and is limited to the line that intersects the location of the specific communication path Ld that has been thinned out as the "provisional deletion". In the example in FIG. 10, this segmenting line SL2 cuts three inter-station communication paths L, other than the specific communication path Ld. Namely, the number of cuts made by the segmenting line SL2 is "3".

In practice, the number of cuts is calculated for each of a large number n (the number is undefined) of segmenting lines SL1 to SLn. However, in the example in FIG. 10, it is assumed that the number of cuts made by the segmenting line SL2 is the smallest. Thus, in the example in FIG. 10, the minimum number of cuts Nc, which is calculated in step S19 in FIG. 6, is "3".

The computer main body 41 repeats each process illustrated in FIG. 6, and finally, for example, the model having a configuration illustrated in FIG. 11 is generated as output data Dy. The configuration illustrated in FIG. 11 represents a result of thinning out another specific communication path LB from the configuration of the state in FIG. 10.

That is, the computer main body 41 performs each process illustrated in FIG. 6 so that the model having the configuration illustrated in FIG. 11 can be generated from the model having the configuration illustrated in FIG. 8. Comparing these configurations makes it clear that the number of the inter-station communication paths L connecting the buildings is significantly reduced in the model in FIG. 11. That is to say, the total number of the inter-station communication paths L needed can be reduced while maintaining the multiple failure tolerance specified by the parameter n so that the topology can be optimized to reduce the equipment costs and the operating costs.

In the example illustrated in FIG. 8, it is assumed that the initial data D0 is generated such that the inter-station communication path L exists between the adjacent buildings for all the buildings included in the regional transmission network 10. However, the configuration of the initial data D0 may be changed as described in (1) and (2) below, as needed.
(1) The combination of the inter-station communication paths L in the initial data D0 is changed so as to reflect the actual optical fiber laying state in the regional transmission network 10.
(2) In view of the costs based on the inter-building distance and the technical transmission distance, the combination of the inter-station communication paths L in the initial data D0 is changed such that the communication paths L in a place where the laying is difficult are thinned out from the beginning.

<Example of Segmenting Lines>

Figure 12:
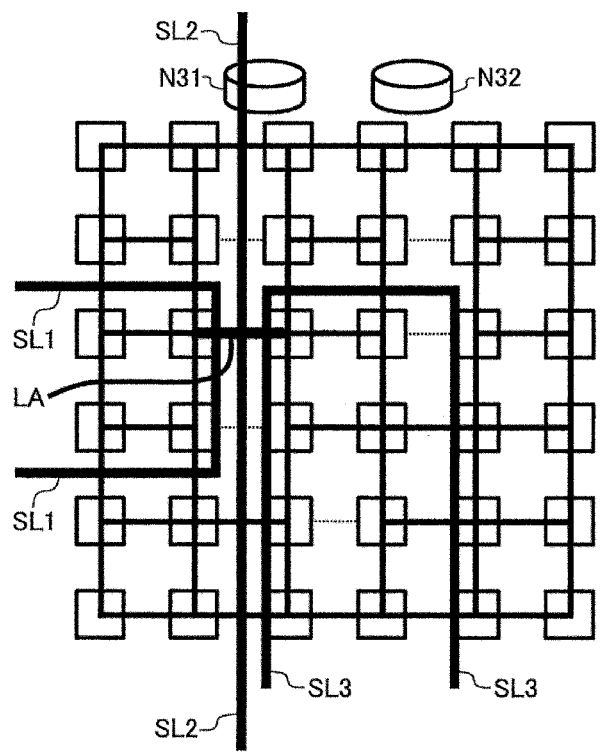
FIG. 12 is a schematic view illustrating an example of a plurality of segmenting lines allocated on the regional transmission network model.

To evaluate whether or not the specific communication path thinned out as a provisional deletion in step S18 is appropriate, the transmission network topology design method and the transmission path design program illustrated in FIG. 6 uses the minimum number of cuts Nc calculated in step S19. In addition, when the minimum number of cuts Nc is calculated, a plurality of segmenting lines SL1 to SLn are generated in step S31 illustrated in FIG. 7. FIG. 12 illustrates an example of a plurality of segmenting lines SL1, SL2, and SL3 described above. While the example in FIG. 12 illustrates only three kinds of segmenting lines, more segmenting lines are generated in actual processing.

As illustrated in FIG. 12, three segmenting lines SL1, SL2, and SL3 are allocated to the positions where the segmenting lines SL1, SL2, and SL3 each intersect the specific communication path LA in the "provisional deletion" state, which has been thinned out immediately before. Further, the three segmenting lines SL1, SL2, and SL3 are all allocated in such a manner to divide the whole model into two regions.

Here, focusing on the first segmenting line SL1, it can be seen that this segmenting line SL1 cuts the inter-station communication paths L indicated by solid lines at four locations. That is, in the case of the segmenting line SL1 in FIG. 12, the number of cuts Nc1 in step S32 in FIG. 7 is "4".

Further, the second segmenting line SL2 in FIG. 12 cuts the inter-station communication paths L indicated by solid lines at three locations. Thus, the number of cuts Nc2 in step S32 in FIG. 7 is "3". Likewise, the third segmenting line SL3 in FIG. 12 cuts the inter-station communication paths L indicated by solid lines at seven locations. Thus, the number of cuts Nc3 in step S32 in FIG. 7 is "7".

Thus, in the example in FIG. 12, the number of cuts made by the segmenting line SL1 is "4", the number of cuts made by segmenting line SL2 is "3", the number of cuts made by the segmenting line SL3 is "7", etc., and the smallest number of all is "3", which is the result obtained by the "minimum cut calculation" in FIG. 7 as the minimum number of cuts Nc.

<Advantages of the Above Embodiment>
(1) A transmission path design apparatus according to the present invention includes: an initial data holding unit that holds initial data of a transmission network model in which a plurality of base stations adjacent to each other in a transmission network having multiple base stations are connected by communication paths that are configured in a mesh shape as a whole, a model calculation unit, and a data output unit that outputs output data generated by the model calculation unit.

The model calculation unit acquires initial data of a transmission network model held by the initial data holding unit and extracts, from the multiple base stations in the transmission network model, a first group of base stations each of which has the number of communication-path routes connected thereto larger than a specified value. Further, the model calculation unit extracts, from the communication paths, a first group of communication paths each of which connects the base stations in the first group and determines a first base station connected to one end of each of the communication paths in the first group and a second base station connected to an opposite end of the each of the communication paths in the first group. Next, the model calculation unit calculates a both-end path value based on the number of the communication-path routes of the first base station and the number of the communication-path routes of the second base station. Further, the model calculation unit determines, in the first group of communication paths, the communication path whose both-end path value satisfies a predetermined condition as a thinning-out target communication path and generates output data in which the thinning-out target communication path is reflected on the initial data of the transmission network model.

According to the transmission path design apparatus of the above (1), the first group of base stations is extracted so that the base station having a larger margin against multiple failures of the communication paths, namely, the base station having a margin for thinning out the communication path can be specified. Further, the first group of communication paths, which connect the base stations in the first group to each other, can be used as a thinning-out candidate. Further, the both-end path value calculated for each of the communication paths in the first group can be used for determining the priority in the thinning-out candidate communication paths. Thus, among the thinning-out candidate communication paths, the one having a higher priority can be thinned out. As a result, an optimized transmission network topology can be obtained as the output data. That is to say, under the condition that availability against multiple failures is maintained, a communication path topology optimized in view of reducing the amount of equipment needed can be easily designed.

(2) The transmission path design apparatus of the present invention performs each step illustrated in FIG. 6 and calculates a both-end path value $d\_i,j$ as a product of the number of communication-path routes $d\_i$ of a base station on one end of a specific communication path and the number of communication-path routes $d\_j$ of a base station on an opposite end of the specific communication path in step S18. In addition, in steps S14 to S24, the transmission path design apparatus determines a thinning-out target communication path from the communication paths in the first group, which have been extracted as the group of buildings Bx, in descending order from the communication path with the largest both-end path value and repeats the determination of the thinning-out target communication path until a predetermined end condition is satisfied.

According to the transmission path design apparatus of the above (2), while availability of the transmission network against multiple failures, which is specified by a parameter n, is maintained, the total number of communication paths included in the transmission network can be efficiently reduced by selecting the transmission path that can be thinned out in descending order of priority.

(3) The transmission path design apparatus of the present invention performs each step illustrated in FIGS. 6 and 7 and determines a plurality of segmenting lines SL1 to SLn each of which divides the whole transmission network model into two regions in step S31 in FIG. 7. Next, the transmission path design apparatus calculates the number of communication paths that each of the segmenting lines intersects as the number of cuts Nc1 to Ncn in step S32 and determines the minimum value of the number of cuts, namely, the minimum number of cuts Nc in step S33. Next, the transmission path design apparatus determines whether the thinning-out target communication path satisfies a predetermined condition based on the minimum value of the number of cuts.

According to the transmission path design apparatus of the above (3), the minimum number of cuts Nc needed for determining whether the provisional deletion of the specific thinning-out target communication path being focused maintains availability against multiple failures, which is defined by a parameter n, can be determined.

(4) The transmission path design apparatus of the present invention performs each step illustrated in FIG. 6 and creates, as a premise, a model of a regional transmission network including a plurality of regional base stations each of which accommodates traffic of multiple user terminals and a plurality of higher-order base stations each of which accommodates traffic of a plurality of regional base stations as a transmission network model to be processed. In addition, the transmission path design apparatus limits the minimum value of the number of cuts to two or more by a parameter n of multiple failure tolerance in step S12.

According to the transmission path design apparatus of the above (4), in the event of a large-scale disaster, even if two or more failures, for example, the faulty locations L01 and L02 as illustrated in FIG. 4B, simultaneously occur in the regional transmission network, occurrence of isolation of the communication base stations can be avoided. That is, another communication route that bypasses the plurality of faulty locations L01 and L02 can be ensured.

(4) A transmission network topology design method of the present invention includes the following steps. That is, a transmission network topology design method of the present invention includes a step of acquiring initial data of a transmission network model in which a plurality of base stations adjacent to each other in a transmission network having multiple base stations are connected by communication paths that are configured in a mesh shape as a whole.

In addition, the transmission network topology design method of the present invention includes a step of extracting a first group of base stations each of which has the number of communication-path routes connected thereto is larger than a specified value from the multiple base stations in the transmission network model.

The transmission network topology design method of the present invention also includes a step of extracting, from the communication paths, a first group of communication paths each of which connects the base stations in the first group.

In addition, the transmission network topology design method of the present invention includes a step of determining a first base station connected to one end of each of the communication paths in the first group and a second base station connected to an opposite end of the each of the communication paths in the first group and calculating a both-end path value based on the number of the communication-path routes of the first base station and the number of the communication-path routes of the second base station.

Further, the transmission network topology design method of the present invention includes a step of determining, in the first group of communication paths, the communication path whose both-end path value satisfies a predetermined condition as a thinning-out target communication path and generating output data in which the thinning-out target communication path is reflected on the initial data of the transmission network model.

According to the transmission network topology design method of the above (4), the first group of base stations is extracted so that the base station having a larger margin against multiple failures of the communication paths, namely, the base station having a margin for thinning out the communication path can be specified. Further, the first group of communication paths, which connect the base stations in the first group to each other, can be used as a thinning-out candidate. Further, the both-end path value calculated for each of the communication paths in the first group can be used for determining the priority in the thinning-out candidate communication paths. Thus, among the thinning-out candidate communication paths, the one having a higher priority can be thinned out. As a result, an optimized transmission network topology can be obtained as the output data. That is to say, under the condition that availability against multiple failures is maintained, a communication path topology optimized in view of reducing the amount of equipment needed can be easily designed.

(6) In the transmission network topology design method including each step illustrated in FIG. 6, in step S18, the both-end path value $d\_i,j$ is calculated as a product of the number of communication-path routes $d\_i$ of a base station on one end of a specific communication path and the number of communication-path routes $d\_j$ of a base station on an opposite end of the specific communication path. In addition, in steps S14 to S24, a thinning-out target communication path is determined from the communication paths in the first group, which have been extracted as the group of buildings Bx, in descending order from the communication path with the largest both-end path value, and the determination of the thinning-out target communication path is repeated until a predetermined end condition is satisfied.

According to the transmission network topology design method including the steps in the above (6), while availability of the transmission network against multiple failures, which is specified by a parameter n, is maintained, the total number of communication paths included in the transmission network can be efficiently reduced by selecting the transmission path that can be thinned out in descending order of priority.

(7) The transmission network topology design method including the steps illustrated in FIGS. 6 and 7 determines a plurality of segmenting lines SL1 to SLn each of which divides the whole transmission network model into two regions in step S31 in FIG. 7 and respectively calculates, as the numbers of cuts Nc1 to Ncn, the number of communication paths intersected by each of the segmenting lines in step S32. Next, the transmission network topology design method determines the minimum value of the number of cuts, namely, the minimum number of cuts Nc in step S33 and determines whether the thinning-out target communication path satisfies a predetermined condition based on the minimum value of the number of cuts.

According to the transmission network topology design method including the steps of the above (7), the minimum number of cuts Nc needed for determining whether the provisional deletion of the specific thinning-out target communication path being focused maintains the availability against multiple failures, which is defined by a parameter n, can be determined.

(8) A transmission path design program of the present invention causes a computer to perform steps of: acquiring initial data of a transmission network model in which a plurality of base stations adjacent to each other in a transmission network having multiple base stations are connected by communication paths that are configured in a mesh shape as a whole; extracting a first group of base stations each of which has the number of communication-path routes connected thereto is larger than a specified value from the multiple base stations in the transmission network model; extracting, from the communication paths, a first group of communication paths each of which connects the base stations in the first group; determining a first base station connected to one end of each of the communication paths in the first group and a second base station connected to an opposite end of the each of the communication paths in the first group and calculating a both-end path value based on the number of the communication-path routes of the first base station and the number of the communication-path routes of the second base station; and determining, in the first group of communication paths, the communication path whose both-end path value satisfies a predetermined condition as a thinning-out target communication path and generating output data in which the thinning-out target communication path is reflected on the initial data of the transmission network model.

According to the transmission path design program of the above (8), the first group of base stations is extracted so that the base station having a larger margin against multiple failures of the communication paths, namely, the base station having a margin for thinning out the communication path can be specified. Further, the first group of communication paths, which connect the base stations in the first group to each other, can be used as a thinning-out candidate. Further, the both-end path value calculated for each of the communication paths in the first group can be used for determining the priority in the thinning-out candidate communication paths. Thus, among the thinning-out candidate communication paths, the one having a higher priority can be thinned out. As a result, an optimized transmission network topology can be obtained as the output data. That is to say, under the condition that availability against multiple failures is maintained, a communication path topology optimized in view of reducing the amount of equipment needed can be easily designed.

REFERENCE SIGNS LIST

10 Regional transmission network
11, 12, 13, 14 Regional building
13a, 16a, 16f Optical switch
13b, 13c, 16b, 16c, 16g, 16h Inter-station interface
13d, 16d, 16e Transponder
15, 16 Regional representative building
17, 18 Prefectural representative building
20 Access network
21 User terminal
30 Core transmission network
31, 32 Core representative building
41 Computer main body (model calculation unit)
42 Input apparatus
43 Display (data output unit)
44 Storage device (initial data holding unit, data output unit)
51 Transmission path topology design program
52, D0 Initial data
53 Optimized data
100 Transmission path design apparatus
B11, B12, B21, B22, B23, B24 Building
Bx Group of buildings
Dx Intermediate data
Dt Temporary data
Dy Output data
N01, N11, N12, N31 Communication network
Nc Minimum number of cuts
n Parameter of multiple failure tolerance
R1, R21, R22, R23, R24, R25, R26 Ring communication network
L01, L02, R25a, R25b Faulty location
L Inter-station communication path
Ld, LA, LB, LC Specific communication path
SL1, SL2, SL3, SLn Segmenting line

The invention claimed is:

1. A transmission path design apparatus comprising:
an initial data holding unit, implemented in one or more computers, that is configured to hold initial data of a transmission network model in which a plurality of base stations adjacent to each other in a transmission network having multiple base stations are connected by one or more communication paths that are configured in a mesh shape as a whole;
a model calculation unit, implemented in one or more computers, that is configured to:
acquire initial data of a transmission network model held by the initial data holding unit,
extract, from the multiple base stations in the transmission network model, a first group of base stations each of which has a number of communication-path routes connected thereto greater than a specified value,
extract, from the one or more communication paths, a first group of communication paths each of which connects the base stations in the first group,
determine a first base station connected to a first end of each of the communication paths in the first group and a second base station connected to a second end of the each of the communication paths in the first group,
calculate a both-end path value based on a number of the communication-path routes of the first base station and a number of the communication-path routes of the second base station,
determine, in the first group of communication paths, the communication path whose both-end path value satisfies a predetermined condition as a thinning-out target communication path, and generate output data in which the thinning-out target communication path is reflected on the initial data of the transmission network model; and a data output unit that is configured to output data generated by the model calculation unit.

2. The transmission path design apparatus according to claim 1, wherein the model calculation unit is configured to:

calculate the both-end path value as a product of the number of communication-path routes of the first base station and the number of communication-path routes of the second base station, determine the thinning-out target communication path from the communication paths in the first group in descending order from the communication path with the largest both-end path value, and repeat the determination of the thinning-out target communication path until a predetermined end condition is satisfied.

3. The transmission path design apparatus according to claim 2, wherein the model calculation unit is configured to:

determine a plurality of segmenting lines each of which divides the whole transmission network model into two regions, calculate the number of communication paths that each of the segmenting lines intersects as a number of cuts, determine a minimum value of the number of cuts, and determine whether the thinning-out target communication path satisfies a predetermined condition based on the minimum value of the number of cuts.

4. The transmission path design apparatus according to claim 3, wherein the model calculation unit is configured to:

create a model of a regional transmission network including a plurality of regional base stations each of which accommodates traffic of multiple user terminals and a plurality of higher-order base stations each of which accommodates traffic of a plurality of regional base stations as a transmission network model and limits the minimum value of the number of cuts to two or more.

5. A transmission network topology design method comprising:

acquiring initial data of a transmission network model in which a plurality of base stations adjacent to each other in a transmission network having multiple base stations are connected by communication paths that are configured in a mesh shape as a whole;

extracting a first group of base stations each of which has a number of communication-path routes connected thereto is greater than a specified value from the multiple base stations in the transmission network model;

extracting, from the one or more communication paths, a first group of communication paths each of which connects the base stations in the first group;

determining a first base station connected to a first end of each of the communication paths in the first group and a second base station connected to a second end of the each of the communication paths in the first group;

calculating a both-end path value based on a number of the communication-path routes of the first base station and a number of the communication-path routes of the second base station;

determining, in the first group of communication paths, the communication path whose both-end path value satisfies a predetermined condition as a thinning-out target communication path; and generating output data in which the thinning-out target communication path is reflected on the initial data of the transmission network model.

6. The transmission network topology design method according to claim 5, comprising:

calculating the both-end path value as a product of the number of communication-path routes of the first base station and the number of communication-path routes of the second base station; and determining the thinning-out target communication path from the communication paths in the first group in descending order from the communication path with the largest both-end path value and repeating the determination of the thinning-out target communication path until a predetermined end condition is satisfied.

7. The transmission network topology design method according to claim 6, comprising:

determining a plurality of segmenting lines each of which divides the whole transmission network model into two regions, calculating the number of communication paths that each of the segmenting lines intersects as a number of cuts, determining a minimum value of the number of cuts, and determining whether the thinning-out target communication path satisfies a predetermined condition based on the minimum value of the number of cuts.

8. A non-transitory computer medium having stored thereon a transmission path design program causing a computer to perform operation comprising:

acquiring initial data of a transmission network model in which a plurality of base stations adjacent to each other in a transmission network having multiple base stations are connected by communication paths that are configured in a mesh shape as a whole;

extracting a first group of base stations each of which has a number of communication-path routes connected thereto is greater than a specified value from the multiple base stations in the transmission network model;

extracting, from the one or more communication paths, a first group of communication paths each of which connects the base stations in the first group;

determining a first base station connected to a first end of each of the communication paths in the first group and a second base station connected to a second end of the each of the communication paths in the first group;

calculating a both-end path value based on a number of the communication-path routes of the first base station and a number of the communication-path routes of the second base station determining, in the first group of communication paths, the communication path whose both-end path value satisfies a predetermined condition as a thinning-out target communication path; and generating output data in which the thinning-out target communication path is reflected on the initial data of the transmission network model.

9. The non-transitory computer medium according to claim 8, wherein the operations further comprise:

calculating the both-end path value as a product of the number of communication-path routes of the first base station and the number of communication-path routes of the second base station; and determining the thinning-out target communication path from the communication paths in the first group in descending order from the communication path with the largest both-end path value and repeating the determination of the thinning-out target communication path until a predetermined end condition is satisfied.

10. The non-transitory computer medium according to claim 9, wherein the operations further comprise:
   determining a plurality of segmenting lines each of which divides the whole transmission network model into two regions;
   calculating the number of communication paths that each of the segmenting lines intersects as a number of cuts;
   determining a minimum value of the number of cuts; and
   determining whether the thinning-out target communication path satisfies a predetermined condition based on the minimum value of the number of cuts.

* * * * *